United States Patent [19]

Ogawa et al.

[11] 4,177,850
[45] Dec. 11, 1979

[54] LARGE-SIZED PNEUMATIC RADIAL TIRE

[75] Inventors: Hiroshi Ogawa, Kodaira; Shigeta Aoki, Higashi-Murayama; Tatsuo Arai, Fuchu, all of Japan

[73] Assignee: Bridgestone Tire Company Limited, Tokyo, Japan

[21] Appl. No.: 825,732

[22] Filed: Aug. 18, 1977

[30] Foreign Application Priority Data

Aug. 31, 1976 [JP] Japan .................... 51/103827

[51] Int. Cl.² .............. B60C 11/04; B60C 11/06
[52] U.S. Cl. .................... 152/209 R; 152/361 R
[58] Field of Search ......... 152/209 R, 209 A, 209 B, 152/209 WT, 209 D, 361 R, 330 R

[56] References Cited

U.S. PATENT DOCUMENTS

| | | | |
|---|---|---|---|
| 2,290,625 | 7/1942 | Stein | 152/209 R |
| 2,850,066 | 9/1958 | Nellen | 152/209 R |
| 3,055,410 | 9/1962 | Caulkins | 152/209 R |
| 3,486,546 | 12/1969 | Sidles et al. | 152/330 R |
| 3,586,086 | 6/1971 | Boileau | 152/209 R |
| 3,664,402 | 5/1972 | Montagne | 152/209 R |
| 3,693,687 | 9/1972 | Hannover et al. | 152/209 R |
| 3,858,633 | 1/1975 | Boileau | 152/209 R |
| 3,946,782 | 3/1976 | Petrasek et al. | 152/209 R |
| 3,990,493 | 11/1976 | Caretta | 152/361 R |

*Primary Examiner*—Trygve M. Blix
*Assistant Examiner*—Lawrence E. Williams
*Attorney, Agent, or Firm*—Sughrue, Rothwell, Mion, Zinn and Macpeak

[57] ABSTRACT

A large-sized pneumatic radial tire is disclosed. This tire comprises a tread including grooves, a belt composed of a plurality of rubberized layers each containing steel cords, and a carcass of a radial or semiradial construction. The tread includes two half regions divided with respect to a crown center, one of which being a region in a direction of plysteer due to the tire construction and the ground contact reaction force acting to steel cords of at least one rubberized layer disposed near the tread and the other being a region opposite to the direction of plysteer. Reinforcements are provided on walls of tread grooves at kicking-out side of the region opposite to the direction of plysteer.

8 Claims, 16 Drawing Figures

FIG. 4c Distribution of Circumferential Lagging Amount of Tread

FIG. 4b Distribution of Ground Contact Pressure

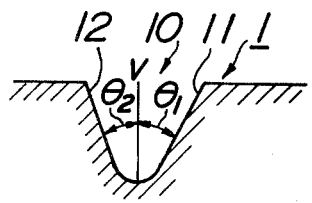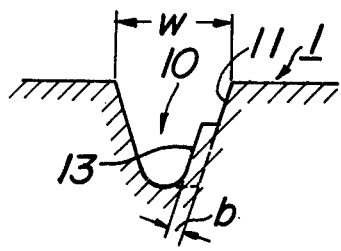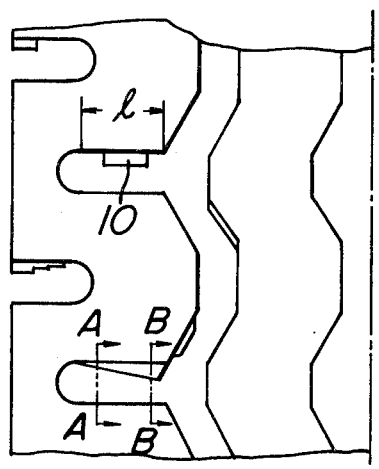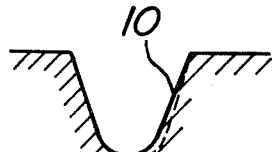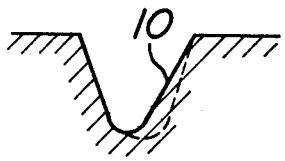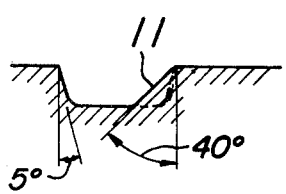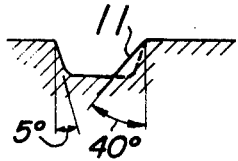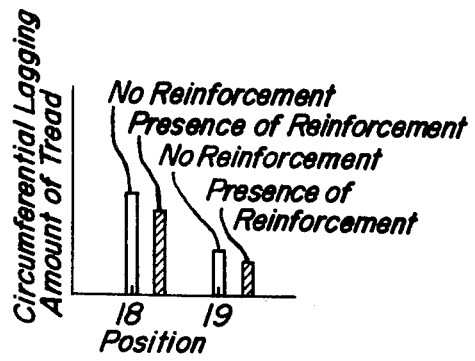

LARGE-SIZED PNEUMATIC RADIAL TIRE

This invention relates to large-sized pneumatic radial tires, and more particularly, to an improvement for tread configuration of large-sized pneumatic radial tires.

In the tires of this type, there are provided a carcass of a radial or semiradial construction and a belt superimposed intimately about the carcass, which serve as a reinforcement for the tire. This belt is generally composed of a plurality of rubberized cord layers, at least one layer of which being composed of steel cords and frequently disposed near a tread of the tire.

Such large-sized pneumatic radial tires are particularly used in a flat form having an aspect ratio of not more than 0.9 for highway bus and truck, monorail vehicle, electric car and the like. In these applications, however, it has been encountered that a peculiar and abnormal wear is caused to shorten a wear-resistant life of the tire.

That is, when a vehicle provided with such tires goes straight forwardly or backwardly on good road, for example, a general driveway paved with concrete, asphalt and so on or a single-purpose track for monorail vehicle or electric car, as shown in FIG. 1, the abnormal wear is concentrically caused in shadowed portions along grooves in the tread near both shoulder sides of the tire, particularly one-side edges S, S' of tread grooves g, g' extending substantially in a widthwise direction of tire. In FIG. 1 is shown a schematic illustration of tread configuration in the tire of this type viewed from the rear side of the vehicle, the rotating direction of tire being shown by an arrow. Surprisingly, the abnormal wear is formed at a kicking-out side or toe side t of a tread element e in a left half region B viewed from a center line X-X' of a crown and also at a stepping-in side or heel side h of the tread element e in a right half region A.

According to general experience relating to the pneumatic radial tire, it has been confirmed that a stepped wear or so-called "heel and toe" wear is formed at the kicking-out side t due to the following fact; that is, at that portion of the tread element firstly contacting with ground during the rotating of the tire, i.e. stepping-in side h, the ground contact pressure becomes gradually increases as the ground contact area becomes large and then gradually decreases as the stepping-in side h leaves from ground, while at the kicking-out side t contacting with ground followed to the stepping-in side h, the increase of ground contact pressure is small owing to the presence of succeding tread grooves g, g' and the kicking-out side t is liable to be displaced toward the tread grooves g, g', so that a lagging movement of the kicking-out region accompanied with such displacement is caused against ground before the ground contact pressure reaches to a sufficient value.

In general, a tread pattern of the tire is constructed with groove parts and island parts. The island parts are called as ribs, lugs and blocks in accordance with their forms and the groove parts are called as main grooves, lateral grooves, branch grooves, fine grooves, sipes and the like in accordance with their forms. In any island parts, which are divided in a circumferential direction of tire by two groove parts inclined at an angle $\alpha$ of 0°–90° with respect to the circumferential direction and arranged at a given interval in the circumferential direction, that portion of the island part early contacting with ground during the rotating in a given direction is defined as the stepping-in side h and that portion of the island part late contacting with ground is defined as the kicking-out side t. Of course, both the sides h and t become opposite when the rotating direction of the tire is reversed.

In the aforesaid applications, the phenomenon of such stepped wear has been observed only at the kicking-out side in the left half region of tire and only at the stepping-in side in the right half region of tire as shown in FIG. 1, which will be described below.

A pattern of tread grooves used for tread configuration of tire is variously selected in accordance with performances required for the tire such as breaking performance, cornering performance and the like. In general, such pattern is a series of repeated pattern units with respect to the circumferential direction of tire, provided that the half portions of the pattern unit are symmetrically arranged at the left and right half regions viewed from the crown center while shifting these portions at a half pitch with each other in the circumferential direction. In case of tires for passenger car, construction vehicle or agricultural vehicle, the half portions of pattern unit may be unsymmetrically arranged at the left and right half regions viewed from the crown center. In the applications aimed at by the invention as mentioned above, however, such unsymmetrical patterns are not usually adopted. Moreover, the cross-section of the tread groove is usually V-shaped with the angles of the walls of the groove in the vicinity of 5° with respect to a vertical line of tread surface.

With the foregoing in mind, the different wear behaviors at the left and right half regions viewed from the crown center are grasped as a peculiar phenomenon inherent to the large-sized pneumatic radial tire according to the invention.

Now, the inventors have made various studies with respect to the main cause of such peculiar phenomenon and found out that this phenomenon is closely related to the construction of tire.

Namely, in the large-sized pneumatic radial tire of this type it has been found that the regions of causing the above mentioned peculiar wear are determined by a direction of internal camber thrust acting to the tire (hereinafter referred to as plysteer), which is produced due to the tire construction and to a ground contact reaction force acting to steel cords of at least one rubberized layer disposed near the tread and constituting a belt as a reinforcing member together with a carcass.

Such plysteer is indicated by an arrow T directing to an alphabet Y as shown in FIG. 2 when the tire is rotated in an upward direction. In FIG. 2 is illustrated a cord arrangement of steel cord layers in the large-sized pneumatic radial tire 1, wherein a carcass (not shown) of the tire 1 is surrounded with a belt composed of several steel cord layers 2, 3, among which at least one cord layer disposed near the tread 4 is constituted with steel cords 3' each having a high rigidity and inclined at a given angle $\beta$ with respect to the circumferential direction of tire.

Further, the inventors have made various observation and examination in detail with respect to the tire shown in FIG. 2. As a result, it has been found that when the rotation of the tire is set in a given direction, the abnormal wear relating to FIG. 1 is caused only at the left half region B of the tread viewed from the crown center X-X' and is hardly caused at the remaining right half region A of the tread. Moreover, it has been confirmed that if the rotation of the tire is reversed, the abnormal wear is first caused at the right half region A of the tread because the stepping-in side h of the tread element is converted into the kicking-out side t due to the reversal rotation of tire.

As seen from the above, the abnormal wear shown in FIG. 1 is recognized to be apparently a composite phenomenon developed by complicating the wears at the left and right half regions of the tread with each other every each rotating direction of tire when the tires provided on the vehicle are run with the change of location at a suitable time or when the rotating direction of tire is altered by shuttling of the electric car provided with the tires.

Repeatedly, it can be said that the development of abnormal wear at different positions depends upon the rotating direction of tire. In the embodiment of FIG. 2, when the tire is rotated in an upward direction, the abnormal wear is caused only at the left half region B viewed from the crown center X-X' as shown in FIG. 3a, while when the tire is rotated in a downward direction, the abnormal wear is caused only at the right half region A as shown in FIG. 3b.

Such phenomenon of developing the wear only at each half region of the tread is investigated as follows.

That is, when plysteer T is produced during the rotating of tire in an upward direction, the tire 1 is slightly deformed toward a direction of plysteer T as shown by a dot-dash-line in FIG. 4a. As a result, a shoulder portion at the right half region A of the tread slightly rises to the surface of ground and has a ground contact pressure lower than that of a shoulder portion at the remaining left half region B of the tread as shown in FIG. 4b.

Thus, the ground contact reaction force of the tread element e becomes large at the left half region of the tread having a high ground contact pressure, so that this tread element is apt to be lagged against ground surface and particularly, the lagging of the tread element is concentrically caused on an edge of tread groove at the kicking-out side as shown in FIG. 4c. As a result, local wear is formed on the edge of the tread groove at the kicking-out side of the tread element.

According to the invention, there is provided a large-sized pneumatic radial tire, comprising a tread including grooves, a belt composed of a plurality of rubberized layers each containing steel cords, and a carcass of a radial or semiradial construction, said tread including two half regions divided with respect to a crown center, one of said regions being a region in a direction of plysteer which is produced due to the tire construction and to the ground contact reaction force acting to said steel cord of at least one rubberized layer disposed near said tread and acts upon the tire and the other region being a region opposite to the direction of plysteer, characterized by providing reinforcements on walls of said grooves at kicking-out side of said region opposite to the direction of plysteer.

In a preferred embodiment of the invention, reinforcements are also provided on the walls of the grooves at stepping-in side of the half region of the tread in the direction of plysteer, whereby the tire is preferably used in applications of alternately reversing the rotating direction of tire. Further, the invention is adapted to tires having an aspect ratio of not more than 0.9 or tires provided with a tread having a ratio of tread gauge to belt total gauge of 0.7-2.5.

The invention will now be described in greater detail with reference to the accompanying drawings, wherein:

FIGS. 4b and 4c are graphical representations showing distributions of ground contact pressure and circumferential lagging amount of the tread in the tire of FIG. 4a, respectively;

FIGS. 6 and 7 are cross-sectional views of tread groove provided with embodiments of a reinforcement according to the invention and taken along a line C—C of FIG. 2, respectively;

FIG. 8 is a partial schematic illustration of another embodiment of the tire provided at its tread groove edges with reinforcements according to the invetion;

FIGS. 9 and 10 are cross-sectional views of the tread groove taken along lines A—A and B—B of FIG. 8, respectively;

FIGS. 11a and 11b are cross-sectional views of another embodiment of the tread groove provided with reinforcements according to the invention and taken along lines C—C and D—D of FIG. 2, respectively; and FIG. 12 is a graphical representation illustrating an effect of decreasing the lagging amount of tread by the reinforcement according to the invention.

In the practice of the invention, the tread groove is so constructed as the reinforcement that a wall in cross section of the groove is inclined at an angle larger than that of an opposite wall with respect to a vertical line of tread surface, particularly at an angle of 10°-45°. Alternatively, the tread groove has a stage-like protrusion provided on the groove wall at the kicking-out side as the reinforcement. Furthermore, the reinforcement is provided on the groove wall of the tread groove extending at an angle of 30°-90° with respect to the circumferential direction of tire and at the kicking-out side of the tread element. Moreover, it is recommended that the reinforcement is provided on the groove wall of the tread groove at a length corresponding to at least 20% of the length of the groove edge having a substantially straight line.

Figure 1:
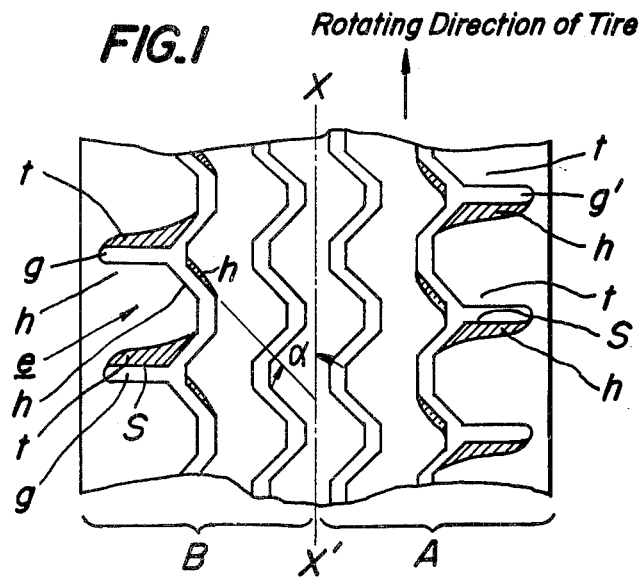
FIG. 1 is a partial schematic view of a rubber tire for electric car illustrating a peculiar wear caused at its tread pattern.
Figure 2:
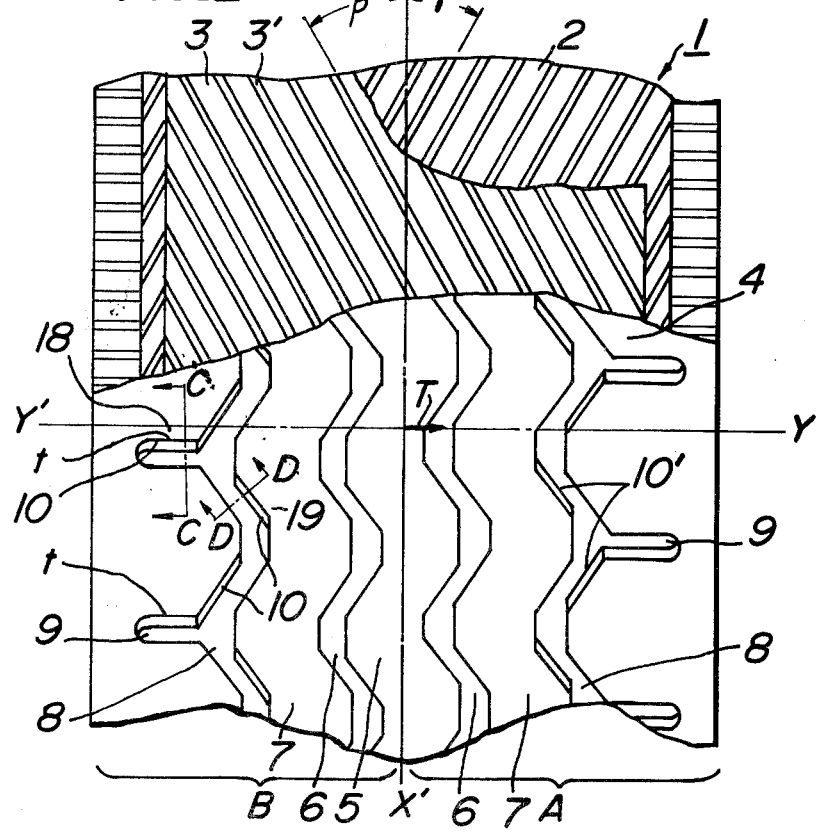
FIG. 2 is a partial schematic view of the tire showing steel cords of a belt in an exposed state by partly cutting out tread rubber from tread surface and illustrating a behavior of peculiar wear phenomenon as well as a means for preventing such wear phenomenon.
Figure 3A:
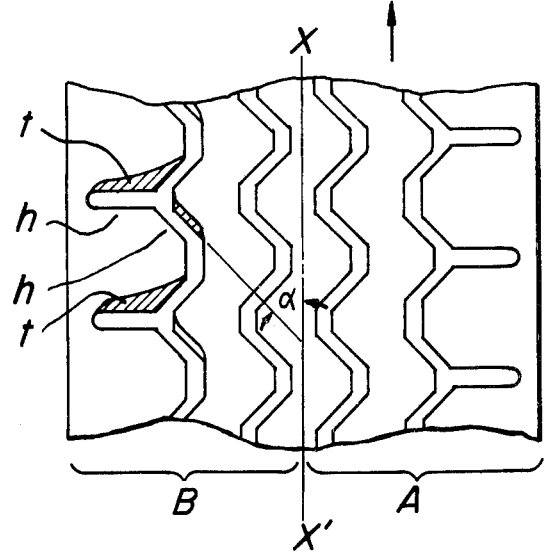
FIG. 3a is a partial schematic view of the tire shown in FIG. 2 illustrating the abnormal wear phenomenon caused during the rotating of tire in an upward direction.
Figure 3B:
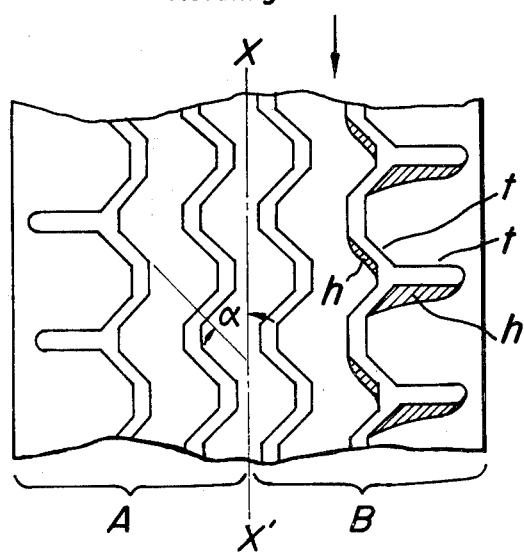
FIG. 3b is a partial schematic view of the tire shown in FIG. 2 illustrating the abnormal wear phenomenon caused during the rotating of tire in a downward direction.
Figure 4A:
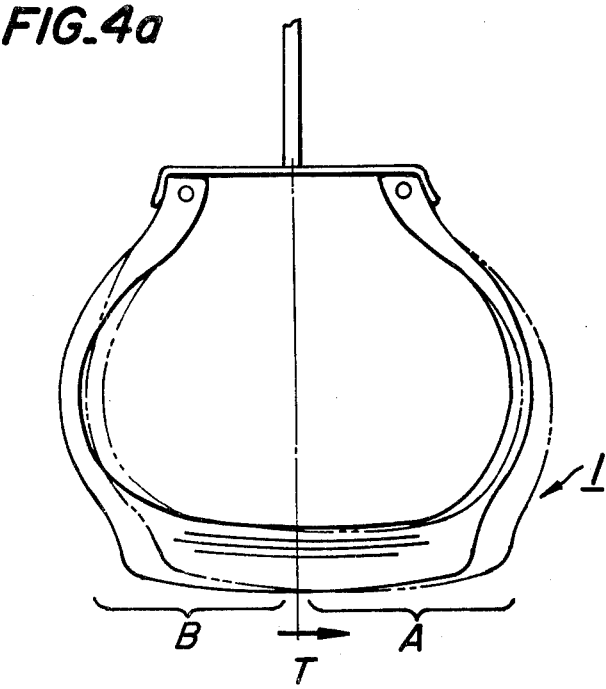
FIG. 4a is a schematically sectional view of the tire deformed by plysteer produced in the rotation of tire.
Figure 4A:
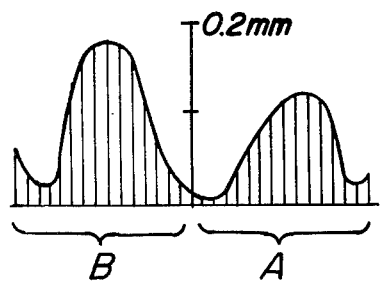
Figure 4A:
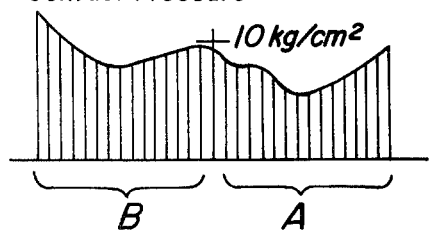

In the embodiment of FIG. 2, the pattern of tread groove comprises a center rib 5, a pair of zigzag type tread center grooves 6 surrounding the center rib, a pair of side ribs 7 disposed outside each of the tread center grooves, and a pair of zigzag type tread side grooves 8 disposed outside each of the side ribs. The tread side groove 8 has a plurality of lateral subgrooves 9 each extending from the protruded portions of the groove 8 toward a shoulder portion of the tire.

In such a pattern, the wear is liable to be concentrically caused along edges of the side groove 8 and subgroove 9 at the kicking-out side t in the left half region B of the tread of the tire 1 as apparent from the above. Therefore, the reinforcements 10 are provided on these edges of such grooves 8, 9. In this case, the groove edge to be reinforced should be inclined at an angle α of 30°-90° with respect to the circumferential direction of tire.

In the applications of alternately reversing the rotating direction of tire, similar reinforcements 10' may be provided along the edges of the grooves to be reinforced at the remaining right half region A of the tread.

The provision of such reinforcement can also be expressed in a viewpoint of tread surface of tire as follows.

That is, when the tire is rotated in an upward direction from ground contact surface, if the plysteer is produced in a right-handed direction, the reinforcement is provided on at least part of each of edges at lower portion of island in the left half region of the tread and upper portion of island in the right half region of the tread. Alternatively, if the plysteer is produced in a left-handed direction, the reinforcement is provided on at least part of each of edges at upper portion of island in the right half region of the tread and lower portion of island in the left half region of the tread.

Figure 5:
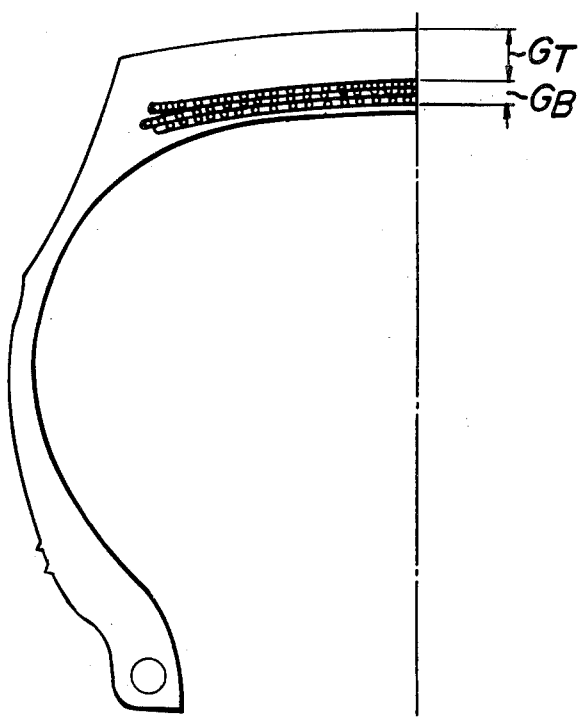
FIG. 5 is a partial schematic illustration of the tire for measuring tread gauge and belt total gauge.

Such reinforcement is particularly effective for tires having an aspect ratio of not more than 0.9. Because, in the tire of this type, the width of the belt is large so that the tire is strongly influenced by the plysteer acting to the outermost cord layer, particularly steel cord layer among cord layers constituting the belt. Further, the invention is preferably adapted to large-sized tires having a ratio (GT/GB) of tread gauge (GT) to belt total gauge (GB) of 0.7-2.5, preferably about 0.9-2.0 because the development of abnormal wear is considerably influenced by the cord layer disposed immediately beneath the tread. As shown in FIG. 5, the tread gauge (GT) is a distance between the surface of the tread and the surface of the outermost cord layer constituting the belt in the crown center and the belt total gauge (GB) is a sum of thicknesses of cord layers constituting the belt in the crown center.

As the reinforcement, according to the invention, that wall of the groove having a tendency to cause wear along its edge is inclined at an angle larger than that of the opposite wall with respect to the vertical line of tread or a stage-like protrusion is provided along such groove wall. However, when the tread groove extends at an angle α of less than 30° with respect to the circumferential direction of tire, there is no problem relating to the development of abnormal wear, so that the provision of the reinforcement is unnecessary. Further, the reinforcement is not necessarily provided on the tread groove over the length of its edge having a substantially straight line and may be provided on the groove at a length corresponding to at least 20% of the length of such groove edge.

As shown in FIG. 6, the reinforcements 10, 10' are so constructed that an angle $\theta_1$ of the groove wall 11 to be reinforced with respect to the vertical line v of the tread 1 is larger than an angle $\theta_2$ of the opposite groove wall 12 with respect to the same vertical line v, i.e. $\theta_1 > \theta_2 > 0$. The angle $\theta_1$ is preferably within a range of 10°-45°. Alternatively, as shown in FIG. 7, a stage-like protrusion 13 is provided as the reinforcements 10, 10' on the groove wall 11 to be reinforced so as to make two groove walls of tread groove unsymmetrical with each other with respect to the vertical line v. In the latter case, the protruded width b of the protrusion 13 is preferably about 20 to 40% of the width w of the tread groove.

The reinforcements 10, 10' are not necessarily provided along the overall length of the groove edge. As shown in FIG. 8, the reinforcement 10 is only extended over the length corresponding to at least 20% of the length l of the groove edge having a substantially straight line.

The cross section of the groove provided with the reinforcement 10 is not necessarily the same over its length. As shown in FIGS. 9 and 10, the cross section of the groove may be changed continuously or stepwisely in accordance with the degree of abnormal wear. In these figures, a dotted line represents a fundamental cross section of tread groove commonly used.

Particularly, the provision of the reinforcement according to the invention is effective for tires having a flat-shaped cross section wherein the width of tread is large and the thickness of tread is small. However, the invention is applicable and effective to tires for bus, truck and the like.

The invention will be described in detail with reference to the following example.

In a pneumatic radial tire for electric car having a size of 1400R 16, reinforcements 10 were provided at the kicking-out positions 18, 19 of the tread element in the tread pattern of FIG. 2 wherein the groove walls 11 at these positions taken along C—C line and D—D line of FIG. 2 were inclined at an angle of 40° with respect to the vertical line of tread as shown in FIGS. 11a and 11b, respectively.

When the tire provided with such reinforcements was rotated in a given direction, the circumferential lagging amount of tread was measured at the kicking-out positions 18, 19 to obtain resuls as shown in FIG. 12. For comparison, the circumferential lagging amount of tread in the tire having no reinforcement is also shown in FIG. 12. As seen from FIG. 12, the circumferential lagging amount of tread can be decreased to about 80% by the provision of the reinforcements 10, whereby the wear-resistant life of the tread can be largely improved to more than two times.

What is claimed is:

1. A large-sized pneumatic radial tire comprising a tread including grooves having alternately directed inclined portions at an angle of 30°-90° with respect to the circumferential direction of the tire, a belt composed of a plurality of rubberized layers each containing steel cords, and a carcass of a substantially radial construction; said tread including two half regions divided with respect to a crown center, one of said regions being a region in a direction of plysteer which is produced due to the tire construction and to the ground contact reaction force acting on said steel cord of at least one rubberized layer disposed near said tread and which acts upon the tire, and the other region being a region opposite to the direction of plysteer; characterized by only providing reinforcements on the kicking-out sides of the walls of said inclined portions of said grooves in said region opposite to the direction of plysteer.

2. A large-sized pneumatic radial tire as claimed in claim 1, wherein said reinforcements are provided only on the stepping-in sides of said walls of said inclined portions of said grooves in said region in the direction of plysteer.

3. A large-sized pneumatic radial tire as claimed in claim 1, wherein said tire has an aspect ratio of not more than 0.9.

4. A large-sized pneumatic radial tire as claimed in claim 1, wherein said tire has a ratio of tread gauge to belt total gauge of 0.7–2.5.

5. A large-sized pneumatic radial tire as claimed in claim 1, wherein said reinforcement is so constructed that a wall of said groove to be reinforced is inclined at an angle larger than that of an opposite wall with respect to a vertical line of tread.

6. A large-sized pneumatic radial tire as claimed in claim 5, wherein said wall of the groove to be reinforced has an angle of 10°–45° inclined with respect to a vertical line of tread.

7. A large-sized pneumatic radial tire as claimed in claim 1, wherein said reinforcement is a step-like protrusion provided on said wall at kicking-out side of the tread groove to be reinforced.

8. A large-sized pneumatic radial tire as claimed in claim 1, wherein said reinforcement is provided on said tread groove at a length corresponding to at least 20% of the length of its groove edge having a substantially straight line.

* * * * *